July 10, 1945.  M. W. HUBER  2,380,179
THRUST BEARING
Filed Aug. 13, 1943
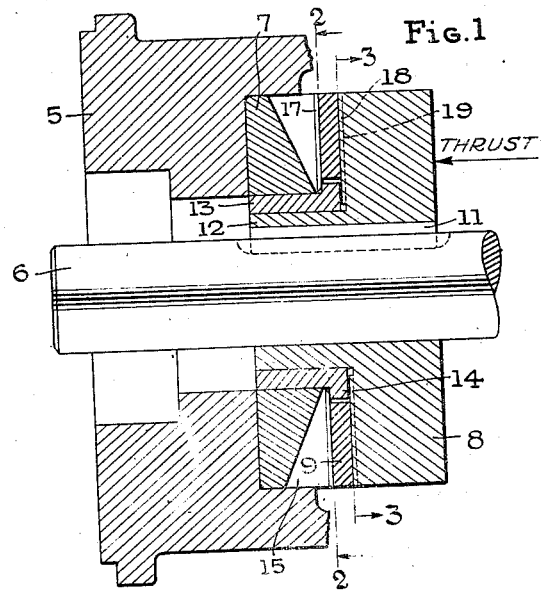
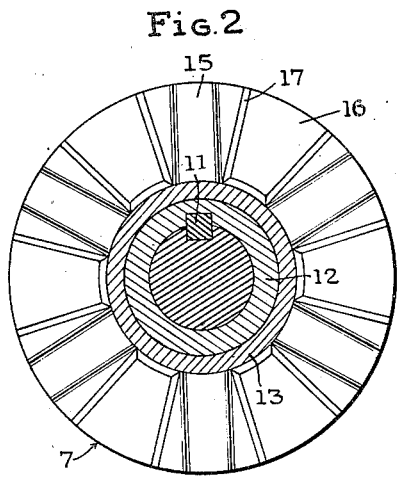
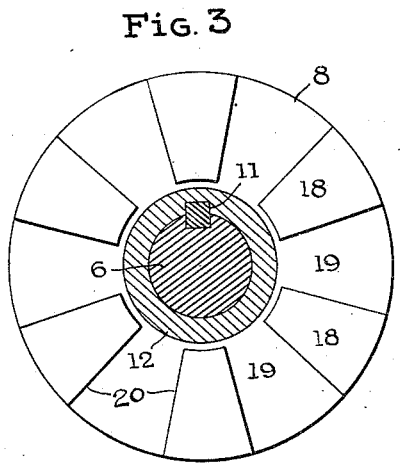
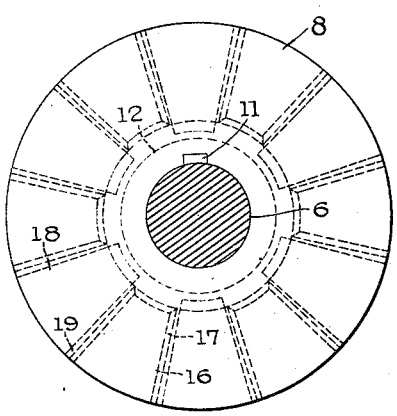
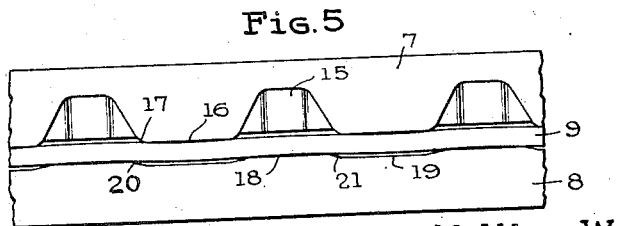
Inventor
Matthew W. Huber
By
Attorneys Patented July 10, 1945

2,380,179

UNITED STATES PATENT OFFICE 2,380,179

THRUST BEARING

Matthew W. Huber, Watertown, N. Y., assignor to The New York Air Brake Company, a corporation of New Jersey Application August 13, 1943, Serial No. 498,479

7 Claims. (Cl. 308—160)

This invention relates to thrust bearings, and particularly to bearings intended to run at high rotary speeds and under heavy axial loads.

The invention is capable of general use but has proved remarkably satisfactory in small high speed high pressure hydraulic pumps in which a swash plate mounted on a rotary shaft actuates a series of plungers substantially parallel with the axis of the shaft and arranged in circular series around the shaft. In such a pump the resultant load is eccentric as to the shaft axis, and consequently eccentric as to the thrust bearing used to sustain the swash plate.

The fact that the thrust bearing operates satisfactorily under eccentric loading is significant, particularly when it is considered that rotary speeds exceed 4,000 R. P. M. with pump discharge pressures of the order of 1,500 p. s. i. Successful operation is not dependent on eccentric loading, on the contrary such loading is considered a seriously adverse factor, when present.

In any thrust bearing adequate lubrication is the truly critical factor. The invention makes use of specially formed plain bearing elements in conjunction with a creep plate so arranged as to flex microscopically, and serving by its flexure to ensure lubrication of both its bearing surfaces. The creep plate also divides the relative motion between bearing components, which is advantageous.

The invention will now be described by reference to drawing showing the preferred embodiment thereof. In the drawing:

Fig. 1 is an axial section through the thrust bearing.

Fig. 2 is a section on the line 2—2 of Fig. 1.

Fig. 3 is a section on the line 3—3 of Fig. 1.

Fig. 4 is a diagram of the bearing areas at the position in which the creep plate is subject to maximum flexure.

Fig. 5 is a development of the cylindrical periphery of the bearing with the parts in the position of Fig. 4.

In Fig. 1, a portion of a machine frame or pump housing is indicated at 5. This typifies any fixed part which sustains the thrust, while the shaft 6 is the rotary element.

The fixed thrust bearing element is indicated generally by the numeral 7 and is seated in a recess in member 5. The rotating thrust bearing element is indicated by the numeral 8. The annular creep plate 9 is interposed between the two.

The member 8 is keyed to shaft 6 at 11. A hub extension 12 on member 8 turns in a radial bearing bushing 13 seated in member 7. The bushing 13 is not loaded in thrust, since its end flange 14, which maintains the creep plate centered, is thinner than the creep plate 9.

The member 7 has a plane bearing face which is interrupted by sector-like recesses or relieved areas 15. In the example illustrated there are six sector-like plane areas 16 each of which is bounded by a convex filleted or slightly rounded margin 17. This is best shown in Fig. 2.

The member 8 also has a plane bearing face which is interrupted, to offer sector-like plane areas 18 which are separated by shallow sector-like relieved areas 19. See Fig. 3. The radial margins 20 of the areas 18 are slightly rounded and the margins of recesses 19 have concave fillets of substantial radius as best shown in Fig. 5, at 21.

As best shown in Figs. 4 and 5, the plane areas on the two members 7 and 8 are equal in number and uniformly spaced. They are so dimensioned that when the plane areas on either face are opposite the recessed areas in the other the creep plate is subjected to slight flexure on radial lines as best illustrated in Fig. 5. This is because the plane areas in one member are of slightly less angular extent than, and hence within the margins of, the recesses on the opposed member.

Actually the flexure is microscopic in degree, but it has the effect of intensifying the entrainment of oil between the bearing surfaces.

The practice is to use a hard steel creep ring, and these rings quickly acquire highly burnished surfaces and operate indefinitely at the high speeds and under the high unit pressures above indicated, with a noticeably reduced tendency to heat. The thrust members 7 and 8 may be of any material suited for use with the steel creep ring.

The invention provides a bearing which can be economically manufactured on a production basis, and which has demonstrated unusually good operating characteristics under severe conditions of speed and load. The design can readily be varied to suit particular installations. While six plane bearing areas are well suited to bearings of the size indicated, it is probable that larger bearings would desirably have a larger number, so as to keep the path of oil entrainment within reasonable limits. The degree of flexure of the creep ring can be determined by choice of its thickness in relation to other dimensions, and the load. In any case it is so small as hardly to be measurable.

What is claimed is:

1. A thrust bearing comprising opposed relatively rotatable thrust members and an interposed creep plate, said members having interrupted bearing surfaces comprising alternating bearing areas and relieved areas similarly arranged on the opposed faces of the thrust members, relieved areas on each member being larger than bearing areas on the other member periodically opposed thereto, whereby the interposed creep plate is subjected to intermittent flexing stresses as the thrust members rotate.

2. A thrust bearing comprising opposed relatively rotatable thrust members; an interposed annular creep plate; and a radial bearing sleeve interposed between said members and serving to center the creep plate, said members having interrupted bearing surfaces comprising alternating bearing areas and relieved areas similarly arranged on the opposed faces of the thrust members, relieved areas on each member being larger than bearing areas on the other member periodically opposed thereto, whereby the interposed creep plate is subjected to intermittent flexing stresses as the thrust members rotate.

3. A thrust bearing comprising a pair of relatively rotatable thrust members and an interposed creep plate, the faces of said members presented to the creep plate having alternate radially extending bearing and relief areas, so dimensioned and similarly spaced that the bearing areas of one are periodically opposed to and within the margins of the relief areas on the other, as the parts rotate, whereby the creep plate is subjected by thrust to multiple flexure on generally radial lines.

4. A thrust bearing comprising a pair of thrust bearing members, each having a bearing surface comprising sector-like bearing areas separated by intervening sector-like relieved areas; and a creep plate interposed between said members, the two bearing members being such that the bearing areas on each become simultaneously opposed to the relieved areas on the other and are then wholly within the margins of said opposed relieved areas, whereby the thrust reaction tends to cause flexure of the creep plate on generally radial lines in such positions and not in others.

5. A thrust bearing comprising a pair of thrust bearing members, each having a bearing surface comprising sector-like bearing areas separated by intervening sector-like relieved areas, the radial marginal portions of the bearing areas on at least one member being rounded; and a creep plate interposed between said members, the two bearing members being such that the bearing areas on each become simultaneously opposed to the relieved areas on the other and are then wholly within the margins of said opposed relieved areas, whereby the thrust reaction tends to cause flexure of the creep plate on generally radial lines in such positions and not in others.

6. A thrust bearing comprising a pair of thrust bearing members, each having a bearing surface comprising sector-like bearing areas separated by intervening sector-like relieved areas, the radial marginal portions of the bearing areas on both members being rounded; and a creep plate interposed between said members, the two bearing members being such that the bearing areas on each become simultaneously opposed to the relieved areas on the other and are then wholly within the margins of said opposed relieved areas, whereby the thrust reaction tends to cause flexure of the creep plate on generally radial lines in such positions and not in others.

7. In a thrust bearing the combination of opposed bearing members having equal numbers of bearing areas which as to each member lie in a common surface of rotation and are uniformly spaced circumferentially by relieved areas of greater angular extent than the bearing areas on the other member; and a creep element interposed between said bearing members and having bearing areas which are continuous surfaces of rotation engaging the bearing areas of respective bearing members, said creep element being of such thickness as to be subject to minute flexure under the thrust load upon the bearing, when the bearing areas on one member are opposite relieved areas on the other.

MATTHEW W. HUBER.